Nov. 7, 1939.  J. SHIMPS, JR  2,178,814
SOLDERING IRON
Filed June 8, 1939  2 Sheets-Sheet 1
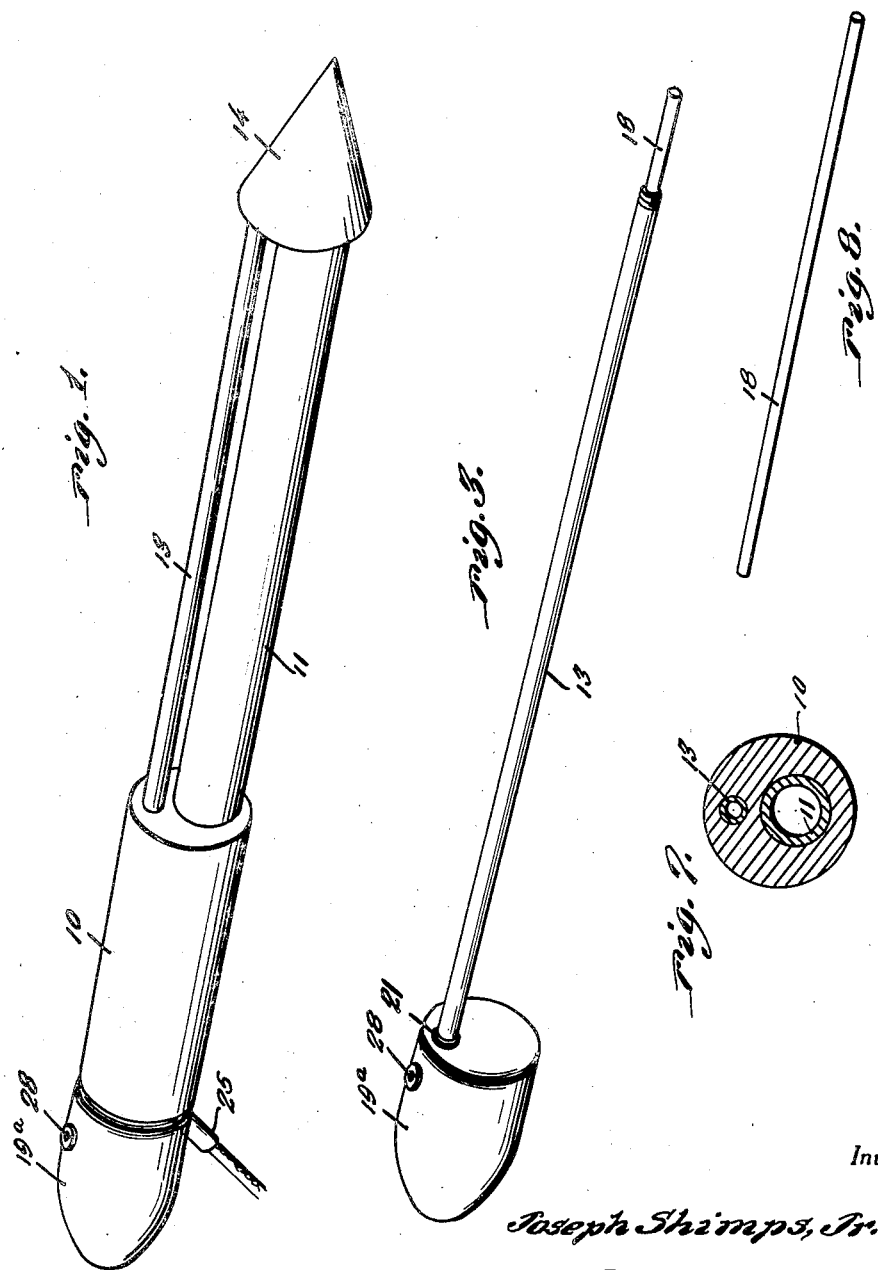
Inventor
Joseph Shimps, Jr.
By Clarence A. O'Brien
and Hyman Berman
Attorneys Nov. 7, 1939.    J. SHIMPS, JR    2,178,814
SOLDERING IRON
Filed June 8, 1939    2 Sheets-Sheet 2
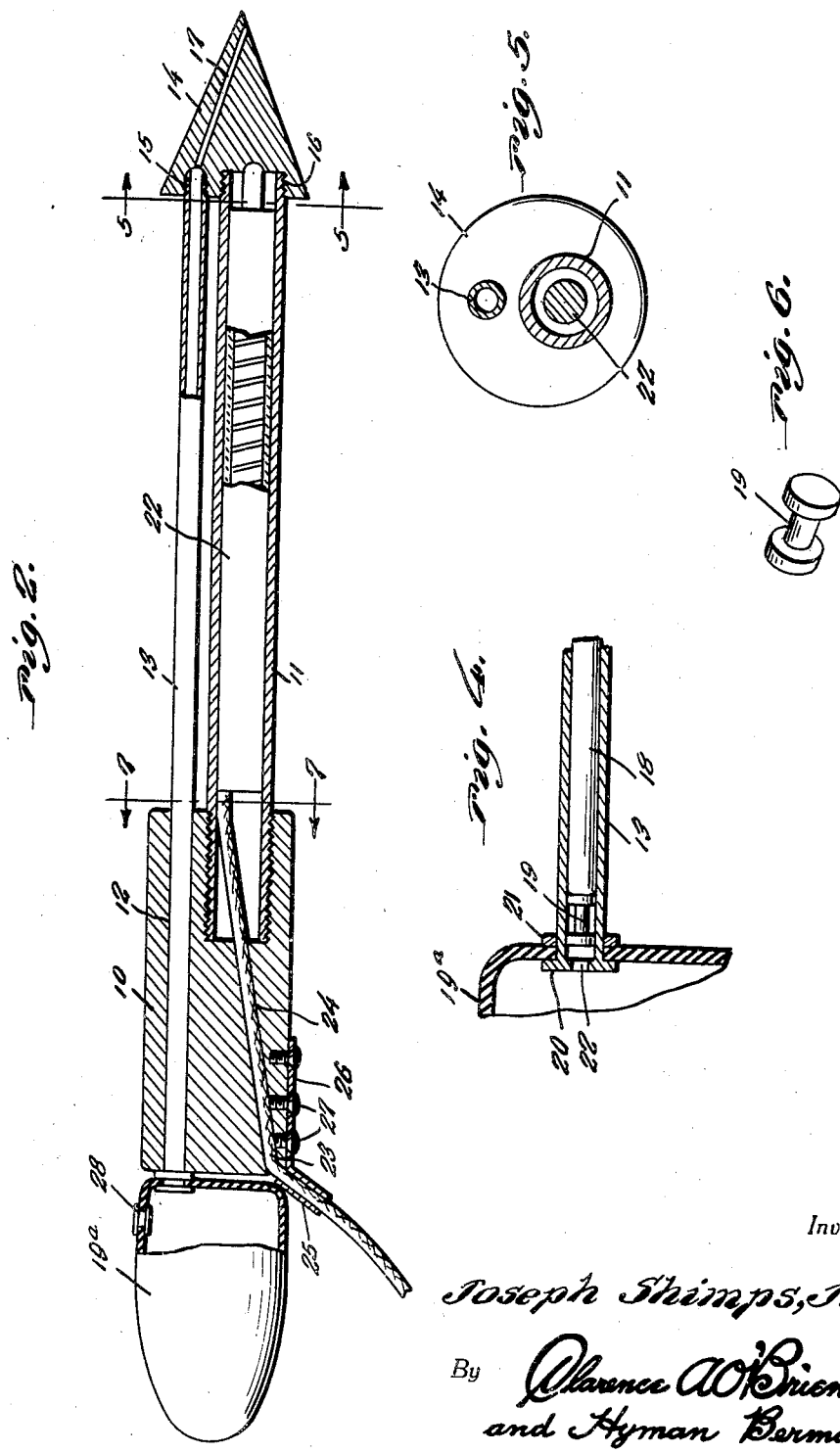
Inventor
Joseph Shimps, Jr.
By Clarence A. O'Brien
and Hyman Berman
Attorneys Patented Nov. 7, 1939

2,178,814

UNITED STATES PATENT OFFICE 2,178,814

SOLDERING IRON

Joseph Shimps, Jr., Coral, Pa., assignor of one-fourth to E. H. Worsham, Washington, D. C.

Application June 8, 1939, Serial No. 278,162

4 Claims. (Cl. 219—27)

This invention relates to an improved soldering iron and more particularly to a type characterized by novel solder-feeding means; and the invention together with its objects and advantages will be best understood from a study of the following description and claims, taken in conjunction with the accompanying drawings wherein:—

Figure 1 is a perspective view of a soldering iron constructed in accordance with the principles of the present inventive conception.

Figure 2 is a longitudinal sectional view therethrough with certain parts shown in elevation.

Figure 3 is a perspective view of a solder-feeding tube and air bulb connected therewith.

Figure 4 is an enlarged fragmentary detail sectional view showing the manner of connecting the feeding tube with the bulb and the follower arranged in the feeding tube.

Figure 5 is a transverse sectional view taken substantially on the line 5—5 of Figure 2.

Figure 6 is a perspective view of the follower.

Figure 7 is also a transverse sectional view taken substantially on the line 7—7 of Figure 2.

Figure 8 is a perspective view of a bar of solder.

Referring more in detail to the drawings it will be seen that the soldering iron comprises a handle embodying a grip 10 of wood or other suitable material into one end of which is threaded a tubular shank 11.

Laterally of the shank 11 the grip 10 is provided with a longitudinal bore 12 through which extends an end portion of a solder bar-feed tube 13.

Threaded on the free end of the feed tube 13 and the shank 11 is a soldering tip 14 that at its major end is provided with a threaded opening 15 that receives the threaded end of the feed tube 13, and a threaded opening 16 which receives the threaded free end of the shank 11.

The tip 14 is provided with orifice 17 through which the solder in liquid form discharges.

The feed tube 13 is adapted to receive a bar 18 of solder, and a follower-piston 19 has a sliding fit within the tube 13 behind the bar 18 for feeding the bar longitudinally of the tube 13 towards the tip 14.

On the end of the tube 13 remote from the tip 14 is a bulb 19a that at one end thereof is provided with an opening that receives the flanged end 20 of the tube 13. On said end of the tube 13 is a clamping collar 21 that cooperates with the flange 20 for securing said end of the tube 13 to the bulb 19a.

At the flanged end 20 thereof the tube 13 is provided with an air orifice 22 that is of materially smaller diameter than the diameter of the tube and through which, by proper compressing of the bulb 19a, air is forced into the tube 13 to act on the piston 19 for causing the latter to move longitudinally within the tube 13 for feeding the bar-solder 18 towards the tip 14.

The shank 11 of the handle accommodates an electrical heating element 23 that has contact with the soldering tip 14 as shown in Figure 2 for heating the tip 14 and consequently melting the solder at the point of connection between the tube 13 and the orifice 17 in the tip 14.

For the heating element 22 there is provided an electric cord 23 that extends through a bore 24 provided therefor in the hand grip 10.

Also for the cord 23 there is provided at the heel end of the hand grip 10 a guide tube 25 formed integral with an attaching flange 26 secured by screws or other fastening elements 27 to the underside of the grip 10. The tube 25 extends at an acute angle to the flange 26 and also serves as a finger grip for convenient holding of the tool with the bulb 19a fitting in the palm of the hand gripping the tool so as to be readily compressed for producing the necessary air pressure to force the follower 19 through the feed tube 13.

The bulb 19a, as clearly shown in Figure 2, is also provided with an air release valve 28.

From the above it will be apparent that as the melted solder is being used the operator presses on the bulb 19a for forcing air into the tube 13 to act against the piston 19. In response to such air pressure the piston 19 moves longitudinally of the tube 13 for forcing the bar of solder 18 towards the soldering point where, through contact with the heated point 14, the bar is melted, the melted solder discharging through the orifice 17 in the point 14 onto the work.

It is thought that the many advantages of a soldering iron of this character will be apparent to those skilled in the art; and further detailed description of the construction, operation and utility is therefore deemed unnecessary.

Having thus described the invention what is claimed as new is:

1. In a soldering iron of the class described, a handle including a hand grip having a tubular shank extending longitudinally therefrom, a soldering point on the free end of said shank, a solder-bar feed tube extending between said hand grip and said point and connected at its respective opposite ends with said grip and point, respectively, said soldering point having a discharge orifice therein extending to said feed tube, said feed tube being adapted to accommodate solder in bar form, a follower mounted in the feed tube for forcing the solder-bar towards the soldering point, air pressure producing means connected with said feed tube adjacent said hand grip, and an electrical heating device arranged within said shank and having direct contact with said soldering point for heating the latter.

2. In a soldering iron of the class described, a handle including a hand grip having a tubular shank extending longitudinally therefrom, a soldering point on the free end of said shank, a solder-bar feed tube extending between said hand grip and said point and connected at its respective opposite ends with said grip and point, respectively, said soldering point having a discharge orifice therein extending to said feed tube, said feed tube being adapted to accommodate solder in bar form, a follower mounted in the feed tube for forcing the solder-bar towards the soldering point, air pressure producing means connected with said feed tube adjacent said hand grip, and an electrical heating device arranged within said shank and having direct contact with said soldering point for heating the latter, said air pressure producing means being in the form of a collapsible bulb.

3. In a soldering iron of the class described, a handle including a hand grip having a tubular shank extending longitudinally therefrom, a soldering point on the free end of said shank, a solder-bar feed tube extending between said hand grip and said point and connected at its respective opposite ends with said grip and point, respectively, said soldering point having a discharge orifice therein extending to said feed tube, said feed tube being adapted to accommodate solder in bar form, a follower mounted in the feed tube for forcing the solder-bar towards the soldering point, air pressure producing means connected with said feed tube adjacent said hand grip, and an electrical heating device arranged within said shank and having direct contact with said soldering point for heating the latter, said heating element having an electric cord connected therewith and extending through an orifice provided therefor in said hand grip, and a combination finger grip and cord protector tube mounted on said hand grip and through which said cord is trained.

4. In a soldering iron of the class described, a handle including a hand grip having a tubular shank extendng longitudinally therefrom, a soldering point on the free end of said shank, a solder-bar feed tube extending between said hand grip and said point and connected at its respective opposite ends with said grip and point, respectively, said soldering point having a discharge orifice therein extending to said feed tube, said feed tube being adapted to accommodate solder in bar form, a follower mounted in the feed tube for forcing the solder-bar towards the soldering point, air pressure producing means connected with said feed tube adjacent said hand grip, and an electrical heating device arranged within said shank and having direct contact with said soldering point for heating the latter, said heating element having an electric cord connected therewith and extending through an orifice provided therefor in said hand grip, and a combination finger grip and cord protector tube mounted on said hand grip and through which said cord is trained, and said air pressure producing means being in the form of a bulb directly connected to said tube and mounted in proximity to said combination finger grip and electric cord protector tube, as and for the purpose specified.

JOSEPH SHIMPS, Jr.